Sept. 16, 1930.   F. H. WRIGHT ET AL   1,775,881
CHANGE SPEED GEARING FOR POWER DRIVEN FOOD MIXING MACHINES
Filed Nov. 5, 1927   2 Sheets-Sheet 1

WITNESSES

INVENTORS

Sept. 16, 1930. F. H. WRIGHT ET AL 1,775,881
CHANGE SPEED GEARING FOR POWER DRIVEN FOOD MIXING MACHINES
Filed Nov. 5, 1927 2 Sheets-Sheet 2

WITNESSES
Wm C Bennett
J. G. M. Aundred

INVENTORS
Frederick Harold Wright
Edmund Woodward Lewis

Patented Sept. 16, 1930

1,775,881

UNITED STATES PATENT OFFICE

FREDERICK HURSH WRIGHT, OF LONDON, AND EDMUND WOODWARD LEWIS, OF LEISTON, ENGLAND

CHANGE-SPEED GEARING FOR POWER-DRIVEN FOOD-MIXING MACHINES

Application filed November 5, 1927, Serial No. 231,321, and in Great Britain November 12, 1926.

This invention relates to change-speed gearing for power-driven food-mixing machines. The gearing is of the type in which changes are effected by the lateral movement of constant-mesh gears mounted on parallel shafts, one set of gear wheels on one shaft being loose and provided with clutch faces which engage with lugs or dogs on said shaft; and the control is of the type in which a single hand lever is employed to disconnect the main clutch and to turn a cam shaft carrying selective cams for changing gear.

Referring to the accompanying drawings.

Figure 1:
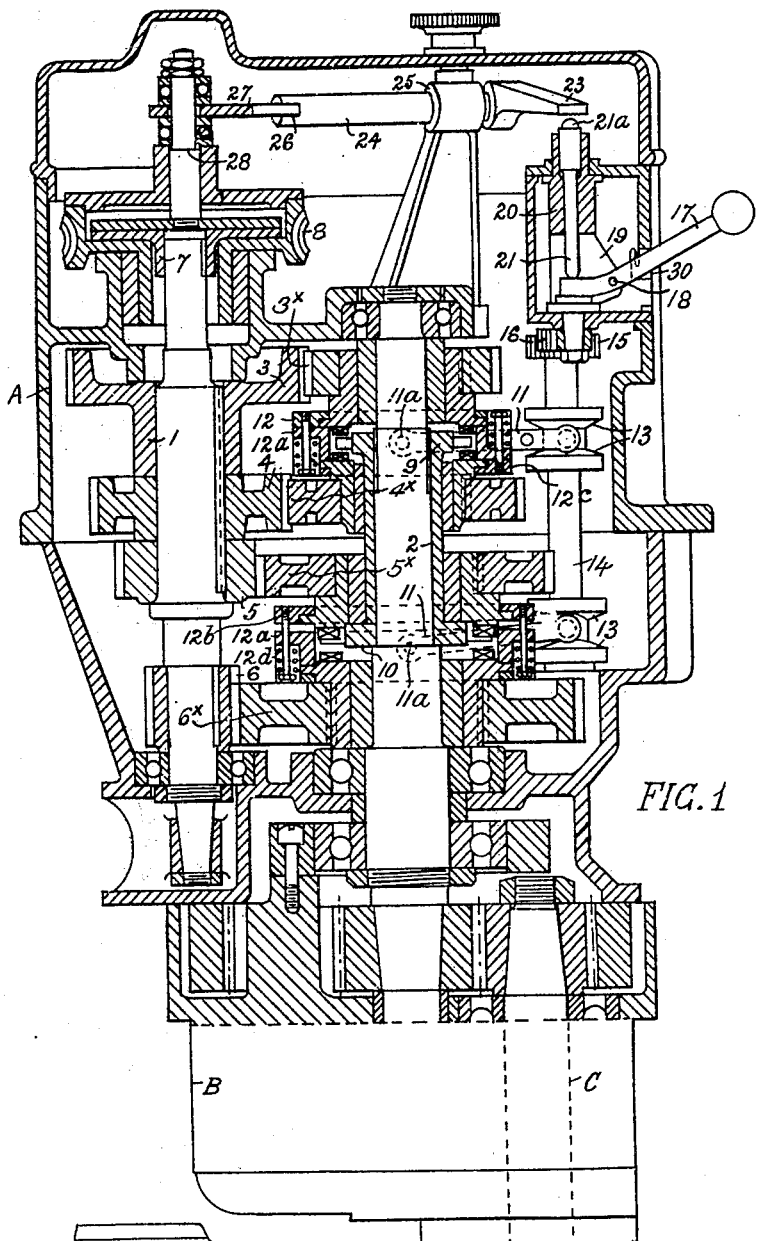
Fig. 1 represents a sectional elevation of the invention as applied to a four-speed change gearing.

The gears and main clutch are housed in a single box A above the revolving head B which carries the usual beater shaft C.

Two parallel shafts 1, 2, carry respectively the gear wheels $3^x$, $4^x$, $5^x$, $6^x$ and 3, 4, 5, 6, preferably spiral gears, those on the shaft 1 being fixed thereto, and those on the shaft 2 being loose and slidable thereon. In addition, the shaft 1 has fixed thereto a clutch plate 7 forming part of a main driving clutch which receives power from a motor or other source. The drawing shows a worm wheel 8 as the part of the clutch to which power is applied.

The shaft 2 has rigidly mounted thereon two dog clutches 9 and 10 one between each pair of loose wheels. Any one of the four loose wheels can be engaged with the respective dog clutch 9 or 10; the drawing shows the loose wheel 5 coming into engagement with the clutch 10, to couple the shaft 1 to shaft 2 through the fast and loose wheels $5^x$ and 5.

This coupling of the dog clutches 9 and 10 and loose wheels is effected by sliding collars 12, pivoted levers or striking forks 11, and cams 13. The levers 11 engage at one end by pins in trunnions $11^a$ on the collars 12, and are tilted at the other end by the cams 13. The cams are mounted on a rotatable shaft 14 which is turned to the desired extent by a pinion 15 and sector 16.

The sector 16 is actuated by the main control lever 17 which can turn on a pivot 18 mounted on cheeks or flanges 19 on a slotted rotatable stud 20, the lower end of which is a solid pivot carrying the sector 16.

To prevent damage to the gears through the dog clutches 9, 10, not being in the exact position to enter into engagement smoothly with the loose wheels, the sliding collars 12 are made as three superposed rings surrounding the dog clutches and yieldingly connected together by springs. The central part $12^a$, Figs. 3 to 6, is a ring of sufficient thickness to prevent the gear wheels from engaging the dog clutches while in a mid position, and has two diametrically opposite trunnions $11^a$ for pins on the forked end of the lever 11. The two outer ring portions $12^b$, $12^c$ are attached to the central part $12^a$ by springs $12^d$ and bolts $12^e$ which tend to keep each pair of gear wheels close to the central part.

Figure 6:
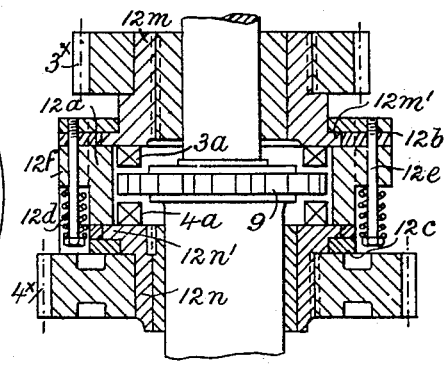
Fig. 6 is a sectional elevation on the plane 5—5, Fig. 5.

The bolts $12^e$ are a loose fit in lugs $12^f$, $12^g$, Figs. 3 to 6, which project in pairs from the curved face of the ring $12^a$, the pair $12^f$ being at the upper part and the pair $12^g$ at the lower part. The ring portions $12^b$, $12^c$ similarly have lugs $12^h$, $12^j$, in which the bolts $12^e$ are screwed, and the ring portions are each shouldered inside to engage flanges $12^{m1}$, $12^{n1}$, on bushes $12^m$, $12^n$ which are keyed to the loose wheels 3, 4 respectively. Each ring portion may consist of two flat rings as shown in Fig. 6, and the bushes $12^m$, $12^n$ may be provided with liners as shown in Figs. 1 and 6. Each collar 12 as a whole can therefore slide longitudinally but is prevented from rotating by the forks and trunnions.

Referring to Figs. 1 and 6, if the central ring $12^a$ is depressed by the lever 11 it will push the loose gear wheel 4 downwards away from the dog clutch 9, and will pull the loose gear wheel 3 also downwards and tending to engage the dogs 3ª with the clutch 9.

If the relative positions of dogs 3ª and clutch 9 are unfavourable for smooth engagement, the springs 12ᵈ yield and the rings 12ª, 12ᵇ separate and permit the lever 11 to assume its correct position; as soon as the unfavourable position is passed, the pressure of the springs 12ᵈ ensures engagement of dogs and clutch, which is further facilitated by the spiral shape of the teeth.

Similarly, if the central ring 12ª is lifted, it will push the loose wheel 3 upwards away from the clutch 9, and will pull the loose wheel 4 upwards and tending to engage the dogs 4ª with the clutch 9, the springs 12ᵈ yielding and the rings 12ª, 12ᶜ separating if the position is unfavourable for engagement.

The horizontal movement of the control lever 17 turns the sector 16 and pinion 15. The vertical movement of the lever 17 on its pivot 18 effects engagement or disengagement of the main clutch by means of a sliding pin 21 and an arm 23 on one end of a short shaft 24; the shaft 24 can turn in a bearing 25 and is slotted at the other end to receive an arm 26 angularly disposed on a fork or slotted plate 27 engaging the slidable portion 28 of the main clutch. Springs tend to keep the clutch engaged, the arm 23 depressed, and lever 17 raised in one or the other of the slots forming a gate 30. The pin 21 is provided with a ball 21ª and is shaped to form a plunger in a dashpot in the stud.

The action of changing gear is as follows:—The control lever 17 is first moved out of the gate 30 by a downward motion, thus turning the shaft 24 and disconnecting the main clutch 7. Then the lever 17 is moved horizontally till it is opposite a fresh gate slot corresponding to the desired gear, thus turning the cam shaft 14 the required amount to bring the corresponding cam 13 into action and tilt one of the levers 11; the collar 12 operated thereby shifts one of the loose wheels into engagement with its corresponding dog clutch, while the companion wheel of the pair is shifted away from the clutch. Finally, the lever 17 is moved into said fresh slot, thus re-engaging the main clutch.

Figure 2:
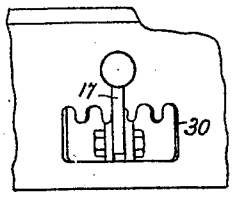
Fig. 2 shows a face view of the gate.
Figure 3:
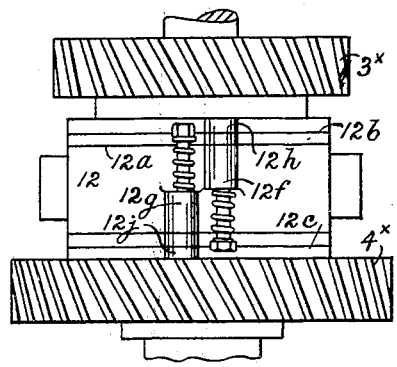
Fig. 3 shows an elevation of the upper sliding collar on a larger scale.
Figure 4:
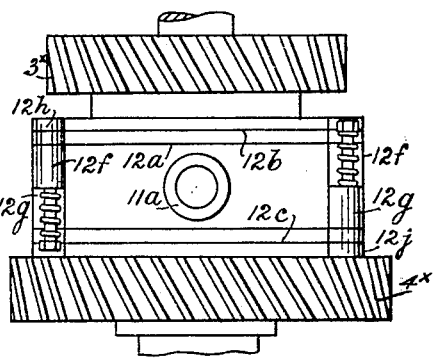
Fig. 4 is a side view of Fig. 3.
Figure 5:
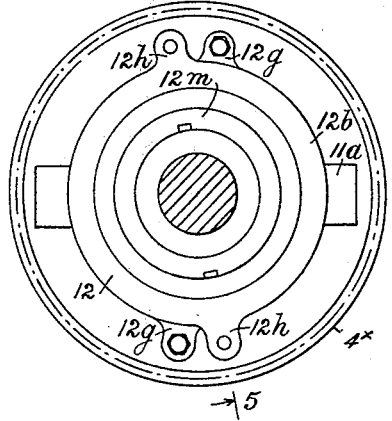
Fig. 5 is a plan of Fig. 3.

As the vertical movement of the lever 17 is comparatively small, the selector gate may be made with short partitions separating the slots; and the lower ends of the partitions are preferably rounded as shown in Fig. 2, so that the lever 17 may glide easily from one slot to another.

Having thus described our invention, what we claim as new and desire to secure by Letters Patent is:—

1. A change speed gearing including a driving shaft, a series of gears fixed thereon, a driven shaft, a series of gears mounted for sliding and free rotation on the driven shaft, the gears of the driving and driven shafts being in constant mesh, a toothed clutching element fixed on the driven shaft between each pair of gears thereon, a cooperating toothed clutching element on each gear of the pair, means for connecting each pair of gears, and means for selectively operating each pair of gears to cause one gear of a pair to move toward the clutching element on the shaft while the other gear of the pair is moved away from such clutching element, the connecting means between each pair of gears being yieldable to permit relative movement between the gears of a pair in the event the clutching elements on the shaft and on the gear to be connected therewith are out of registry.

2. A change speed gearing including a driving shaft, a series of gears fixed thereon, a driven shaft, a series of gears mounted for sliding and free rotation on the driven shaft, the gears of the driving and driven shafts being in constant mesh, a toothed clutching element fixed on the driven shaft between each pair of gears thereon, a cooperating toothed clutching element on each gear of the pair, means for connecting each pair of gears, and means for selectively operating each pair of gears to cause one gear of a pair to move toward the clutching element on the shaft while the other gear of the pair is moved away from such clutching element, the connecting means between each pair of gears being yieldable to permit relative movement between the gears of a pair in the event the clutching elements on the shaft and on the gear to be connected therewith are out of registry, said connecting means compelling clutching cooperation between the selected gear and shaft-carried clutching elements when the clutching elements are in registry.

3. A change speed gearing including a driving shaft, a pair of gears fixed thereon, a driven shaft, a pair of gears mounted on the driven shaft for independent sliding and rotative movement, the gears on the driving shaft and on the driven shaft being in continuous mesh, a collar arranged intermediate the gears of the driven shaft, a ring arranged at each end of the collar and cooperating with the adjacent gear to move the gear in the movement of the ring, yieldable connections between the respective rings to cause the gears to be simultaneously moved in the movement of the rings, manual means for operating the collar to cause the respective rings to move therewith, a toothed clutch element on the shaft intermediate the gears, and a cooperating toothed clutch element on each of the gears, the movement of the collar serving to move the clutch element on one gear into cooperation with the clutch element on the shaft and the clutch element on the other gear out of cooperation with the clutch element on the shaft, the yielding means connecting the rings permitting interruption of the movement of the gear to be brought into clutching cooperation with the shaft in the event the teeth of the clutches are out of clutching registry without interfering with the movement of the collar and thereafter causing clutching cooperation of the parts immediately following proper clutching registry of the teeth.

In testimony whereof we have signed our names to this specification in London, England, this 18th day of October, 1927.

FREDERICK HURSH WRIGHT.
EDMUND WOODWARD LEWIS.